(12) United States Patent
Anderberg (10) Patent No.: US 11,734,873 B2
(45) Date of Patent: Aug. 22, 2023

(54) REAL-TIME VOLUMETRIC VISUALIZATION OF 2-D IMAGES

(71) Applicants: Sony Corporation, Tokyo (JP); Sony Pictures Entertainment Inc., Culver City, CA (US)

(72) Inventor: Tobias Anderberg, Los Angeles, CA (US)

(73) Assignees: Sony Group Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

(21) Appl. No.: 16/883,449

(22) Filed: May 26, 2020

(65) Prior Publication Data

US 2021/0183134 A1 Jun. 17, 2021

Related U.S. Application Data

(60) Provisional application No. 62/947,732, filed on Dec. 13, 2019.

(51) Int. Cl.
*G06T 15/08* (2011.01)
*G06T 7/507* (2017.01)
*G06T 7/55* (2017.01)

(52) U.S. Cl.
CPC .............. *G06T 15/08* (2013.01); *G06T 7/507* (2017.01); *G06T 7/55* (2017.01); *G06T 2207/10016* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 5,748,199 A | 5/1998 | Palm | |
| 9,256,980 B2 | 2/2016 | Kirk | |
| 9,877,009 B2 | 1/2018 | Tran et al. | |
| 2003/0038798 A1 | 2/2003 | Besl et al. | |
| 2007/0206008 A1 | 9/2007 | Kaufman et al. | |
| 2015/0262411 A1 | 9/2015 | Gordon et al. | |
| 2017/0244948 A1* | 8/2017 | Pang | H04N 13/243 |
| 2019/0215486 A1* | 7/2019 | Venshtain | H04N 23/60 |

(Continued)

FOREIGN PATENT DOCUMENTS

| | | |
|---|---|---|
| JP | 2014529831 A | 11/2014 |
| JP | 2015506036 A | 2/2015 |

(Continued)

OTHER PUBLICATIONS

International Preliminary Report on Patentability in corresponding application PCT/US2020/064272, dated Jun. 23, 2022.

(Continued)

*Primary Examiner* — James A Thompson
(74) *Attorney, Agent, or Firm* — Procopio, Cory, Hargreaves & Savitch LLP (57) ABSTRACT

Capturing and visualizing video, including: capturing video data using a plurality of cameras; sending the captured video data to a first shader; calculating depth information at the first shader using the captured video data; generating a three-dimensional (3-D) point cloud using the depth information; and rendering a visualization image using the 3-D point cloud.

15 Claims, 5 Drawing Sheets

(56) References Cited

U.S. PATENT DOCUMENTS

2020/0118342 A1* 4/2020 Varshney .............. H04S 7/304
2021/0118213 A1* 4/2021 Ji ........................ G01B 11/00
2021/0209777 A1* 7/2021 Zhao ................ H04N 21/21805
2021/0375044 A1* 12/2021 George ................. G06T 17/20

FOREIGN PATENT DOCUMENTS

WO        2015107260 A1      7/2015
WO     WO-2017042873 A1      3/2017

OTHER PUBLICATIONS

International Search Report in corresponding application PCT/US2020/064272, dated Jun. 23, 2022.
International Search Report in corresponding application PCT/US2020/064272, dated Mar. 11, 2021.
International Preliminary Report on Patentability in corresponding application PCT/US2020/064272, dated May 17, 2022.
Qiaosong Wang: "Towards Real-time 3D Reconstruction using Consumer UAVs", Arxiv.Org, Cornell University Library, Olin Library Cornell University Ithaca, NY 14853, Feb. 26, 2019 XP081033466.
S.Roehl et al:"Real-time surface reconstruction from stereo endoscopic images for intraoperative registration", Medical Imaging 2011: Visualization, Image-Guided Procedures, and Modeling, SPIE, (Feb. 26, 2019), 1000 20th St. Bellingham WA 98225-6705 USA, vol. 7964, No. 1, Mar. 3, 2011 (Mar. 3, 2011), pp. 1-13, XP060008093, DOI: 10.1117/12.877662.

* cited by examiner

REAL-TIME VOLUMETRIC VISUALIZATION OF 2-D IMAGES

CROSS-REFERENCE TO RELATED APPLICATIONS

This application claims the benefit of priority under 35 U.S.C. § 119(e) of U.S. Provisional Patent Application No. 62/947,732, filed Dec. 13, 2019, entitled "Real-Time Volumetric Visualization of Multispectral 2-D Images." The disclosure of the above-referenced application is incorporated herein by reference.

BACKGROUND

Field

The present disclosure relates to processing video data, and more specifically, to capturing video data for a subject and environment, and presenting a visualization of the captured video data while the data is being captured.

Background

Video systems may use multi-spectral imaging (e.g., a combination of 2-D infrared and color cameras) to reconstruct a 3-D volumetric data set of an object from the captured 2-D data. Traditionally, such a reconstruction process is done "offline" and the system does not present images or visualization to look at or verify the end result until the reconstruction process has finished, which can be a very time-consuming task.

SUMMARY

The present disclosure provides for capturing video data and presenting a visualization of the captured data while data is being captured.

In one implementation, a method for capturing and visualizing video is disclosed. The method includes: capturing video data using a plurality of cameras; sending the captured video data to a first shader; calculating depth information at the first shader using the captured video data; generating a three-dimensional (3-D) point cloud using the depth information; and rendering a visualization image using the 3-D point cloud.

In one implementation, rendering the visualization image includes presenting the visualization image in a 3-D environment. In one implementation, calculating the depth information includes using a distance between two cameras of the plurality of cameras. In one implementation, the method further includes calculating camera lenses to account for lens distortions. In one implementation, the first shader is a compute shader. In one implementation, the method further includes applying color information to the 3-D point cloud. In one implementation, the plurality of cameras comprises at least one IR camera and at least one color camera. In one implementation, the captured video data includes a plurality of IR images. In one implementation, the method further includes inputting the depth information and the at least one color image to a second shader. In one implementation, the method further includes asynchronously applying, by the second shader, color information from the at least one color image to associated points in the 3-D point cloud.

In another implementation, a system to capture and visualize video is disclosed. The system includes: a plurality of 2-D cameras to capture video data; a first compute shader to receive the video data and calculate depth information using the received video data, the first compute shader to generate a 2-D depth buffer using the depth information; and a renderer to render a visualization image of a 3-D point cloud using the 2-D depth buffer.

In one implementation, the system further includes a display to present the visualization image in a 3-D environment. In one implementation, the system further includes a color shader to apply color to the 3-D point cloud. In one implementation, the plurality of 2-D cameras comprises at least one IR camera and at least one color camera. In one implementation, the captured video data includes a plurality of IR images. In one implementation, the system further includes a second compute shader to receive the generated 2-D depth buffer and the at least one color image, generate the 3-D point cloud from the 2-D depth buffer, and asynchronously apply color from the at least one color image to associated points in the 3-D point cloud.

In another implementation, a non-transitory computer-readable storage medium storing a computer program to capture and visualize video is disclosed. The computer program includes executable instructions that cause a computer to: capture video data using a plurality of cameras; send the captured video data to a first shader; calculate depth information at the first shader using the captured video data; generate a 3-D point cloud using the depth information; and render a visualization image using the 3-D point cloud.

In one implementation, the executable instructions that cause the computer to render the visualization image include executable instructions that cause the computer to present the visualization image in a 3-D environment. In one implementation, the executable instructions that cause the computer to calculate the depth information include executable instructions that cause the computer to use a distance between two cameras of the plurality of cameras. In one implementation, the program further includes executable instructions that cause the computer to apply color information to the 3-D point cloud.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, an offline reconstruction process using multi-spectral image devices to reconstruct the 3-D data of an object from the captured 2-D data can be a very time-consuming task. Further, the offline process does not present images or visualization to look at or verify the end result until the reconstruction process has finished.

Certain implementations of the present disclosure provide systems and methods to implement a technique for presenting a reconstruction result or version of the result in real-time, or near real-time, to get a better understanding of the resulting data that is about to be captured. This technique enables final adjustments to be made pre-capture to ensure the resulting data will be as good as possible.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a video system uses graphical processing unit (GPU) "compute shaders" and samples the image stream at set intervals. This enables the system to construct a three-dimensional (3-D) volumetric point cloud of captured 2-D images with color applied to the point cloud. The system presents the point cloud in a 3-D environment. In one implementation, the 3-D environment then uses a virtual camera to navigate around the visualized data set. In one implementation, the video system is used in a video production or studio environment and includes one or more cameras for image capture, and one or more computers to process the camera data.

In other implementations, the system is configured to: (1) present a 3-D scene with a virtual camera for easy verifications of constructed data; (2) generate a depth map from multiple 2-D images (e.g., using multiple cameras including IR cameras and color cameras); (3) construct 3-D point cloud from the generated depth map; and (4) apply color from color camera to the 3-D point cloud.

Figure 1A:
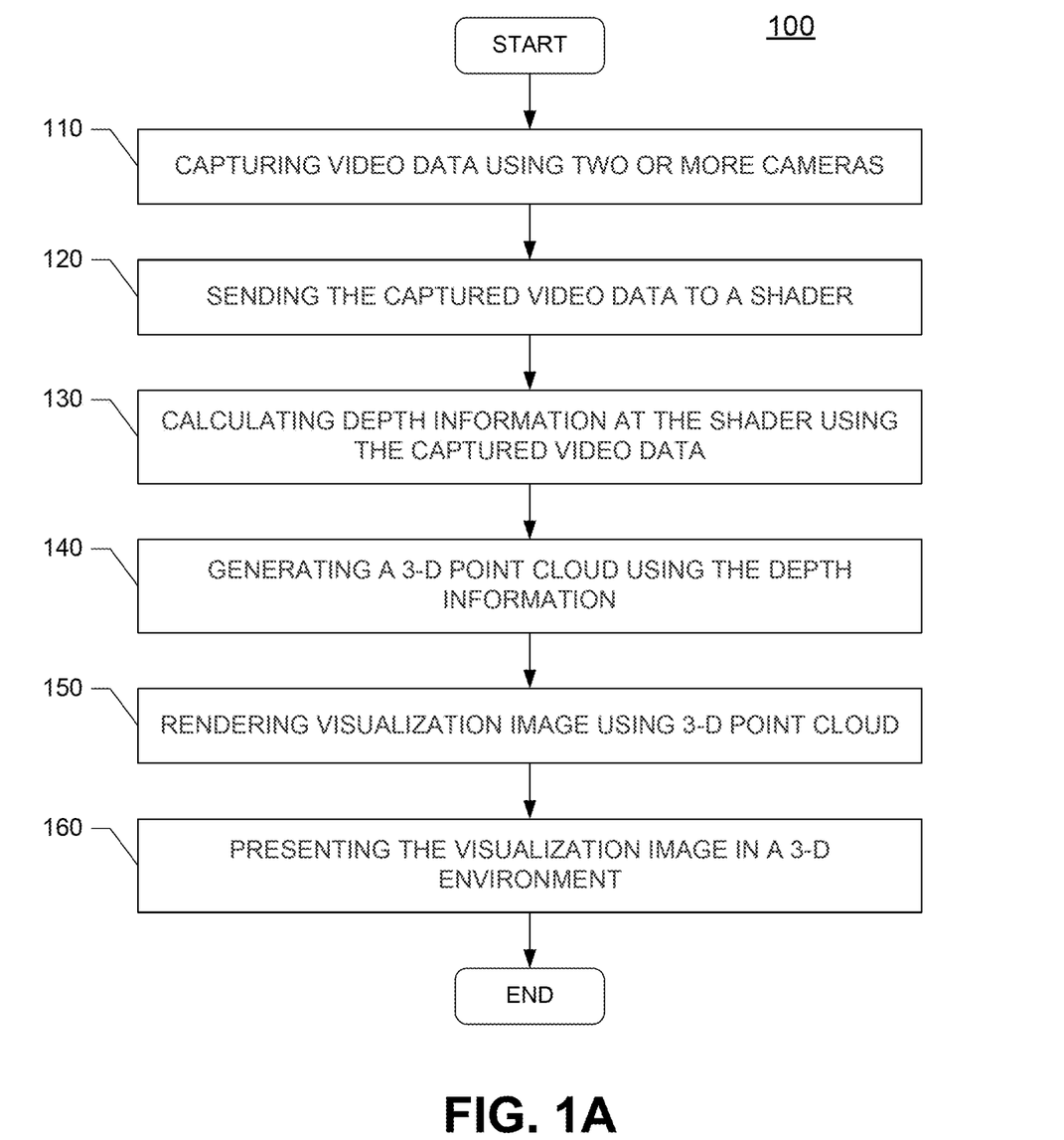
FIG. 1A is a flow diagram of a method for video capture and visualization in accordance with one implementation of the present disclosure.

FIG. 1A is a flow diagram of a method 100 for video capture and visualization in accordance with one implementation of the present disclosure. In the illustrated implementation of FIG. 1A, video data is captured, at step 110, using a plurality of cameras (e.g., 2-D cameras), and the captured video data is sent, at step 120, to a shader. The depth information is then calculated, at step 130, by the shader using the captured video data.

Figure 1B:
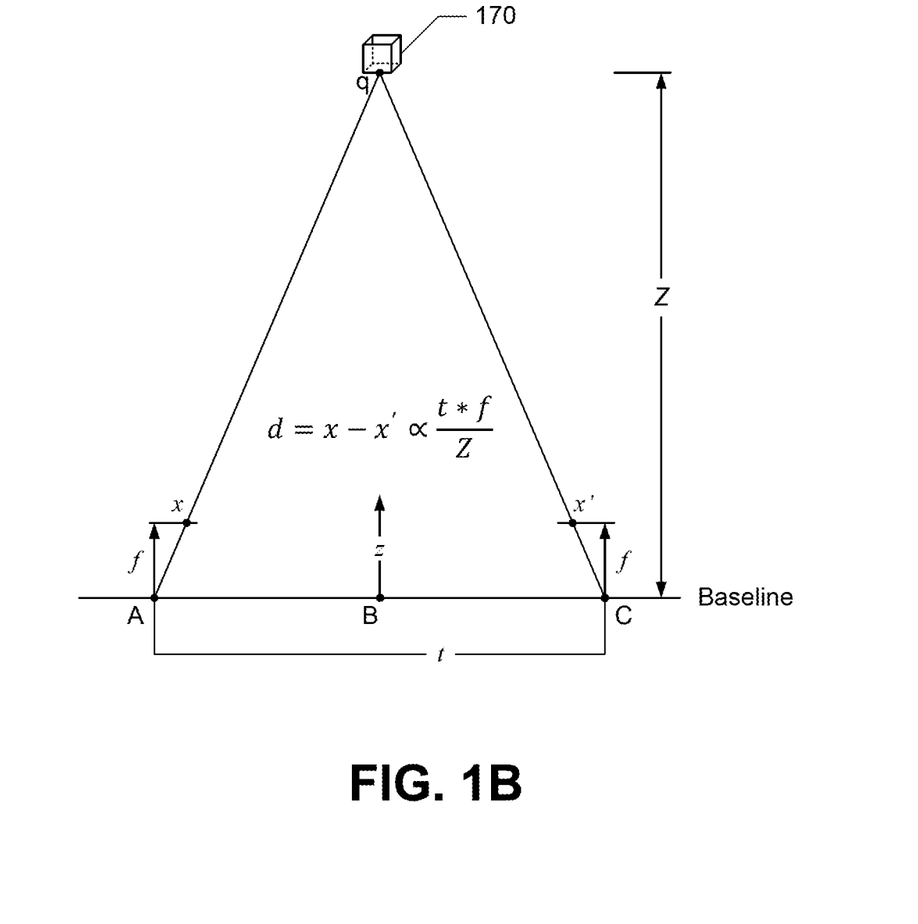
FIG. 1B is a graph showing a process calculating depth information from multiple 2-D cameras.

In one implementation, as shown in FIG. 1B, the method 100 calculates the depth information from 2-D images (e.g., from two or more images or even from just one image) by calibrating the 2-D cameras (e.g., two IR cameras A and C) at a certain distance (y) from each other's optical center on a line referred to as Baseline shown in FIG. 1B. In other implementations, two color cameras may be used. In one implementation, the camera lenses are also calculated to account for the lens distortions. The method 100 also determines a point in space for which to calculate the depth. This point is "seen" in 2-D for the two cameras (e.g., point x for camera A and point x' for camera b). Each camera also has a calibrated focal length (f).

In one implementation, the method 100 first calculates the depth (d) as follows:

$$d = x - x' \propto \frac{t * f}{Z},$$

where t represents the distance between two cameras A and C, f represents the focal length, and Z represents the distance from the Baseline to the focal point (q) of the object 170. Thus, the depth is calculated as the distance between points x and x', and is directly proportional to the product of t and f, and is inversely proportional to distance Z.

Figure 1C:
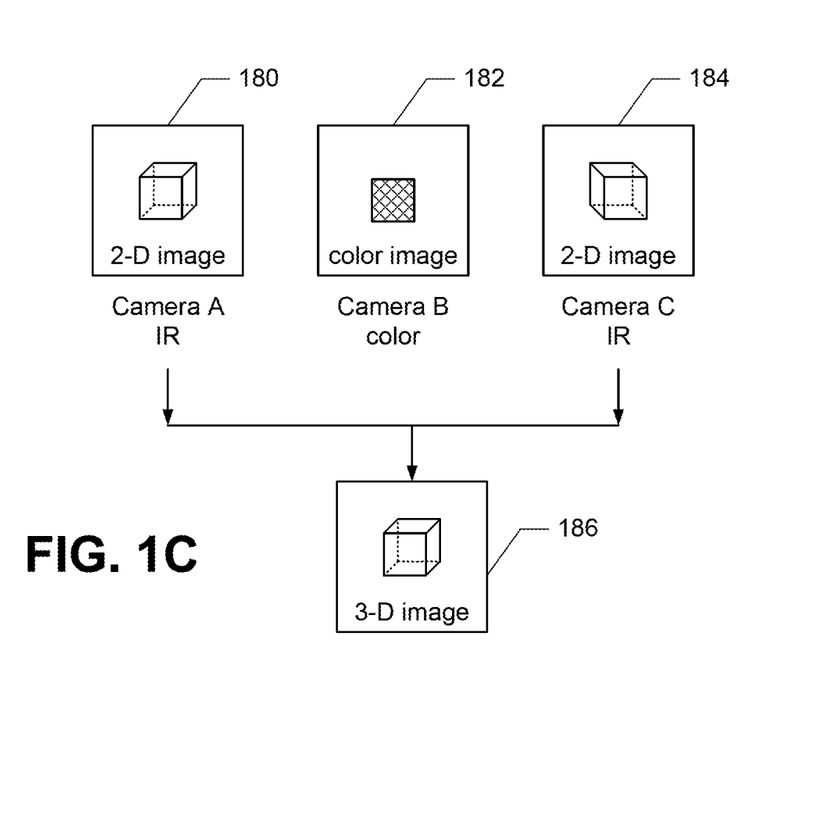
FIG. 1C is an illustration showing a process for combining 2-D images from two IR cameras to generate a 3-D image.

In one implementation, the above-described method 100 is used in an asynchronous compute shader for fast computation. Thus, in this implementation as shown in FIG. 1C, the method 100 provides the two images 180, 184 (e.g., one from an IR camera A and another from an IR camera C) to the asynchronous compute shader (i.e., the first compute shader) as inputs. The first compute shader then calculates a depth buffer and outputs the result as a 2-D depth buffer. Once the depth information is calculated in the form of a 2-D depth buffer, at step 130, a 3-D point cloud 186 is generated, at step 140, using the depth information.

In one implementation, generation of the 3-D point cloud includes calculating the three axes (x, y, z) of the point cloud (3-D point cloud) using the depth buffer. The z position is calculated as $z=(t*f)/(d*p)$, wherein d=depth,
t=the distance between two cameras A and C,
f=the focal length, and
p=point for which z component is calculated.

Calculating the x and y positions depends on the camera focal length (i.e., horizontal field of view (H) and vertical field of view (V)), the resolution (i.e., Resolution width ($R_x$) and Resolution height ($R_y$)), and calculated z. Thus, x and y positions are calculated as $x=z/\tan(x_2)$, wherein $x_2=x_1+p_x*(H/R_x)$, $x_1=(\pi-H)/2$, $y=z*\tan(y_2)*-1$, wherein $y_2=y_1+p_y*(V/R_y)$, $y_1=2*\pi-(V/2)$.

Figure 1D:
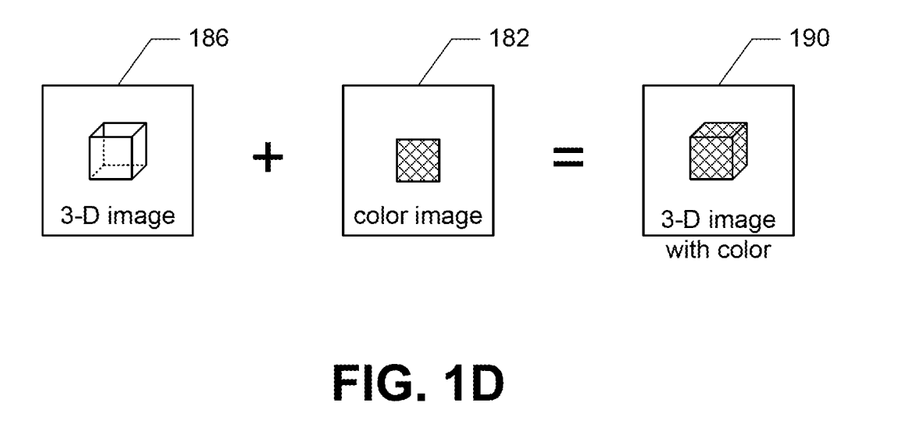
FIG. 1D is an illustration showing a process for combining the 3-D image with a color image to generate a 3-D color image.

A visualization image is then rendered, at step 150, using the 3-D point cloud, and is presented in a 3-D environment, at step 160. In one implementation, as shown in FIG. 1D, color is applied to the 3-D point cloud 186 using the color image 182 captured by color camera B to produce the color 3-D image 190. By presenting the visualization image in the 3-D environment, a user can use a virtual camera to navigate around the resulting volumetric data to inspect the scene and data more closely.

In alternative implementations, following variations are possible. For example, the calculated depth buffers are presented in a 2-D view, such as greyscale images, for more visualization and verifications. In another example, an offline high-powered cloud processing is used to perform the depth construction in "near real-time". In such an example, images are captured from the cameras, data is sent to a cloud system for processing, and the resulting point cloud is sent back to the host machine by the cloud system for rendering.

Figure 2:
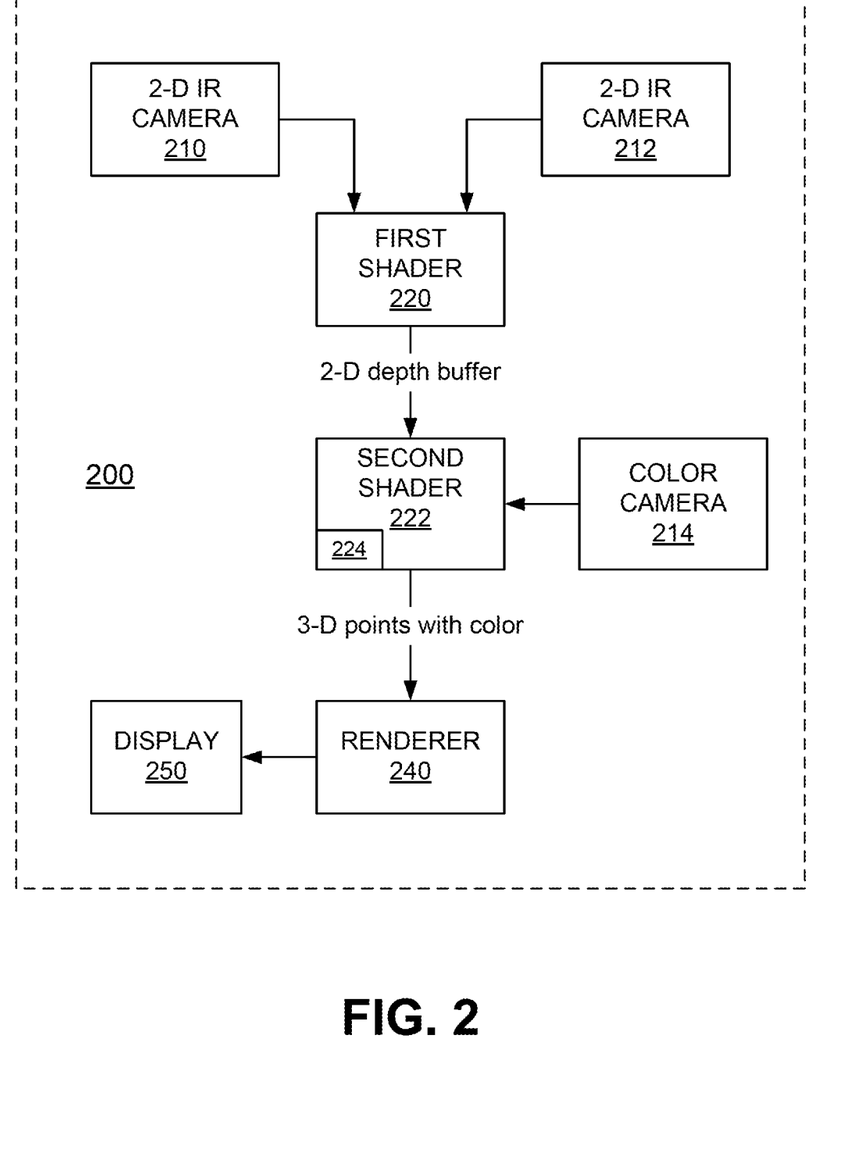
FIG. 2 is a block diagram of a system 200 for video capture and visualization in accordance with one implementation of the present disclosure.

FIG. 2 is a block diagram of a system 200 for video capture and visualization in accordance with one implementation of the present disclosure. In the illustrated implementation of FIG. 2, the system 200 includes a plurality of 2-D cameras 210, 212, 214 including IR cameras 210, 212 and color cameras 214, a first shader 220, a second shader 222, and a renderer 240.

In one implementation, the plurality of 2-D IR cameras 210, 212 captures and transmits video data (i.e., 2-D images) to the first shader 220. The first shader 220 then calculates the depth information using the received video data. Thus, in this implementation, the first shader 220 receives the two images (e.g., one from an IR camera 210 and another from an IR camera 212) as inputs.

In one implementation, the first shader 220 calculates the depth information from the 2-D images (e.g., from two or more images or even from just one image) by calibrating the 2-D IR cameras 210, 212 at a certain distance (y) from each other's optical center (on the Baseline shown in FIG. 1B). In other implementations, two color cameras may be used. In one implementation, the camera lenses are also calculated to account for the lens distortions. The first shader 220 also determines a point in space for which to calculate the depth. This point is "seen" in 2-D for the two cameras 210, 212. Each camera also has a calibrated focal length (f). In one implementation, the first shader 220 is configured as an asynchronous compute shader for fast computation.

In one implementation, the first shader 220 first calculates the depth (d) as follows:

$$d = x - x' \propto \frac{t * f}{Z},$$

where t represents the distance between two cameras 210 and 212, f represents the focal length, and Z represents the distance from the Baseline to the focal point (q) of the object 170. The first shader 220 then calculates a depth buffer, and outputs and sends the result as a 2-D depth buffer to the second shader.

In one implementation, the 2-D depth buffer output by the first shader 220 and a color image from the color camera 214 are input into a second shader 222. The second shader 222 asynchronously applies the colors in the color image to the associated points calculated from the depth buffer. The output of the second shader 222 is a visualization image which is a 3-D point cloud with color data.

In one implementation, the renderer 240 then renders the visualization image onto a display 250 in a 3-D environment. By rendering the visualization image in the 3-D environment, a user uses a virtual camera to navigate around the resulting volumetric data to inspect the scene and data more closely. Thus, in one implementation, the display 250 is coupled to a computing device including a processor to process the visualization image and execute the process necessary to run the virtual camera.

In alternative implementations, cameras capture and transmit the images to a cloud system for processing, and the resulting point cloud is sent back to the system 200 by the cloud system for rendering.

Figure 3A:
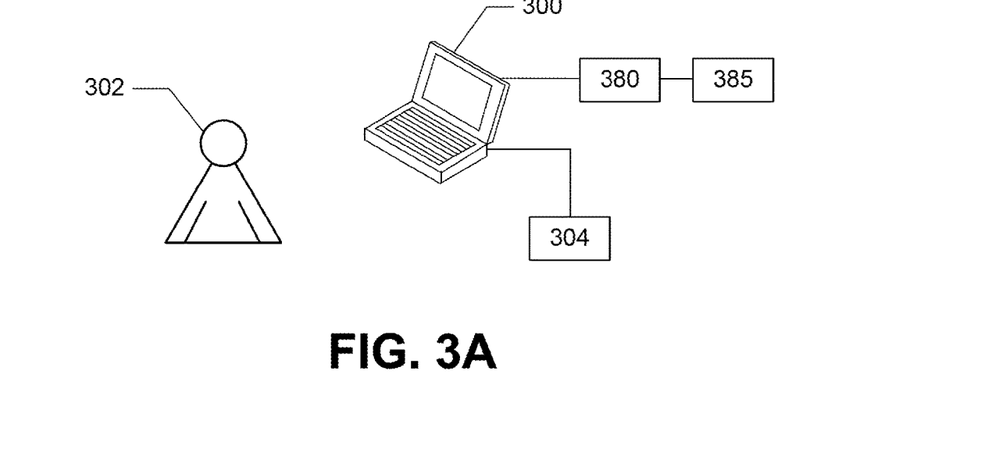
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a video capture and visualization application 390 for video capture and visualization as illustrated and described with respect to the method 100 and the system 200 in FIGS. 1 and 2.

Figure 3B:
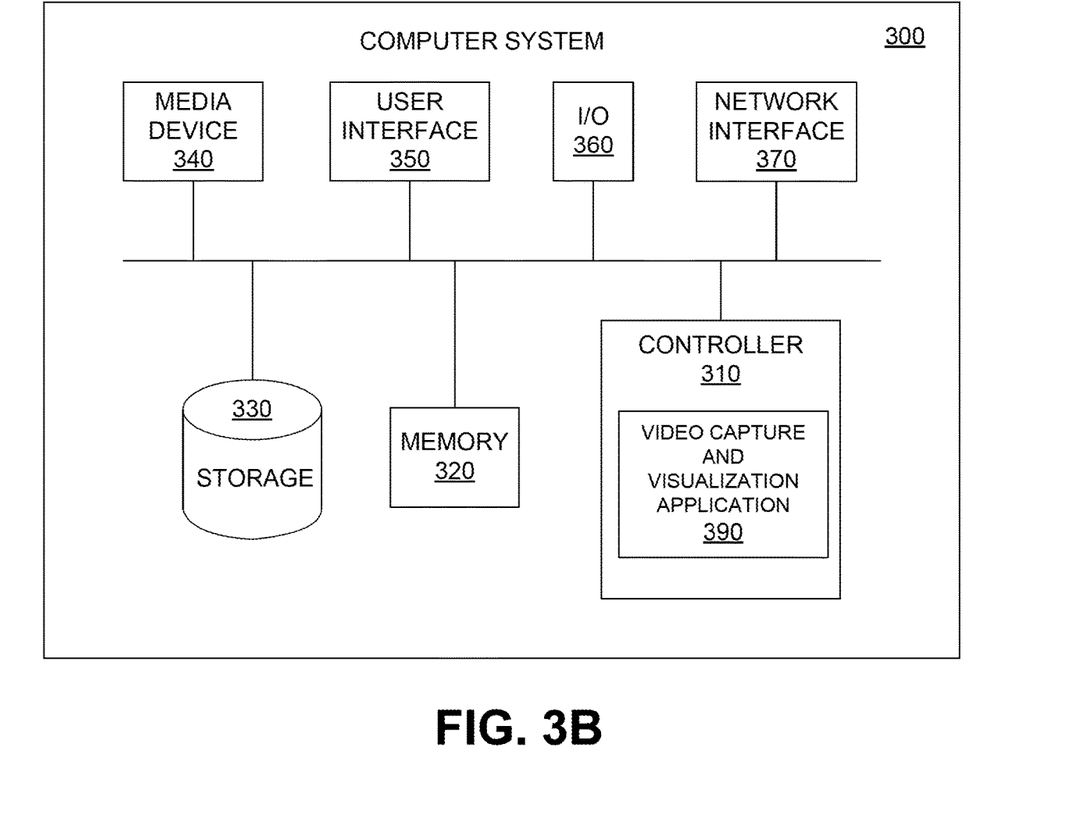
FIG. 3B is a functional block diagram illustrating the computer system hosting the video capture and visualization application in accordance with an implementation of the present disclosure.

The computer system 300 stores and executes the video capture and visualization application 390 of FIG. 3B. In addition, the computer system 300 may be in communication with a software program 304. Software program 304 may include the software code for the video capture and visualization application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the video capture and visualization application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the video capture and visualization application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide the data processing to establish depth and render data to present visualizations. In its execution, the controller 310 provides the video capture and visualization application 390 with a software system, such as to enable the creation of groups of devices and transmission of device setting data in parallel using task queues. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the video capture and visualization application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, in addition to video production for movies or television, implementations of the systems and methods can be applied and adapted for other applications, such as virtual production (e.g., virtual reality environments), or medical imaging. Thus, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for capturing and visualizing video, comprising:
capturing video data using a plurality of 2-D cameras, each camera including an optical center and a focal length, wherein the video data includes a plurality of 2-D images;
sending the captured video data to a first shader;
calculating depth information at the first shader using the plurality of 2-D images,
wherein the depth information is calculated by (a) establishing a base line between optical centers of a pair of 2-D cameras, (b) calculating a camera distance between the optical centers of the pair of 2-D cameras, (c) determining a shortest distance from a point on the base line to a focal point of each of the plurality of 2-D images, and (d) taking a product of the camera distance with the focal length and dividing the product by the shortest distance;
generating a three-dimensional (3-D) point cloud using the depth information and applying color to the 3-D point cloud; and
rendering a visualization image using the 3-D point cloud.

2. The method of claim 1, wherein rendering the visualization image includes presenting the visualization image in a 3-D environment.

3. The method of claim 1, further comprising
calculating camera lenses to account for lens distortions.

4. The method of claim 1, wherein the first shader is a compute shader.

5. The method of claim 1, wherein the plurality of 2-D cameras comprises at least one IR camera and at least one color camera.

6. The method of claim 1, wherein the captured video data includes a plurality of IR images.

7. The method of claim 6, further comprising
inputting the depth information and the at least one color image to a second shader.

8. The method of claim 7, further comprising
asynchronously applying, by the second shader, color information from the at least one color image to associated points in the 3-D point cloud.

9. A system to capture and visualize video, the system comprising:
a plurality of 2-D cameras to capture video data including a plurality of 2-D images,
wherein each 2-D camera includes an optical center and a focal length;
a first compute shader to receive the video data and calculate depth information using the plurality of 2-D images, the first compute shader to generate a 2-D depth buffer using the depth information,
wherein the depth information is calculated by (a) establishing a base line between optical centers of a pair of 2-D cameras, (b) calculating a camera distance between the optical centers of the pair of 2-D cameras, (c) determining a shortest distance from a point on the base line to a focal point of each of the plurality of 2-D images, and (d) taking a product of the camera distance with the focal length and dividing the product by the shortest distance; and
a renderer to render a visualization image of a 3-D point cloud using the 2-D depth buffer and applying color to the 3-D point cloud.

10. The system of claim 9, further comprising
a display to present the visualization image in a 3-D environment.

11. The system of claim 9, wherein the plurality of 2-D cameras comprises at least one IR camera and at least one color camera.

12. The system of claim 9, wherein the captured video data includes a plurality of IR images.

13. The system of claim 12, further comprising
a second compute shader to receive the generated 2-D depth buffer and the at least one color image, generate the 3-D point cloud from the 2-D depth buffer, and asynchronously apply color from the at least one color image to associated points in the 3-D point cloud.

14. A non-transitory computer-readable storage medium storing a computer program to capture and visualize video, the computer program comprising executable instructions that cause a computer to:
capture video data using a plurality of 2-D cameras, wherein each camera includes an optical center and a focal length, wherein the video data includes a plurality of 2-D images;
send the captured video data to a first shader;
calculate depth information at the first shader using the plurality of 2-D images,
wherein the depth information is calculated by (a) establishing a base line between optical centers of a pair of 2-D cameras, (b) calculating a camera distance between the optical centers of the pair of 2-D cameras, (c)

determining a shortest distance from a point on the base line to a focal point of each of the plurality of 2-D images, and (d) taking a product of the camera distance with the focal length and dividing the product by the shortest distance;

generate a 3-D point cloud using the depth information and apply color to the 3-D point cloud; and render a visualization image using the 3-D point cloud.

15. The non-transitory computer-readable storage medium of claim 14, wherein the executable instructions that cause the computer to render the visualization image include executable instructions that cause the computer to present the visualization image in a 3-D environment.

* * * * *